UNITED STATES PATENT OFFICE.

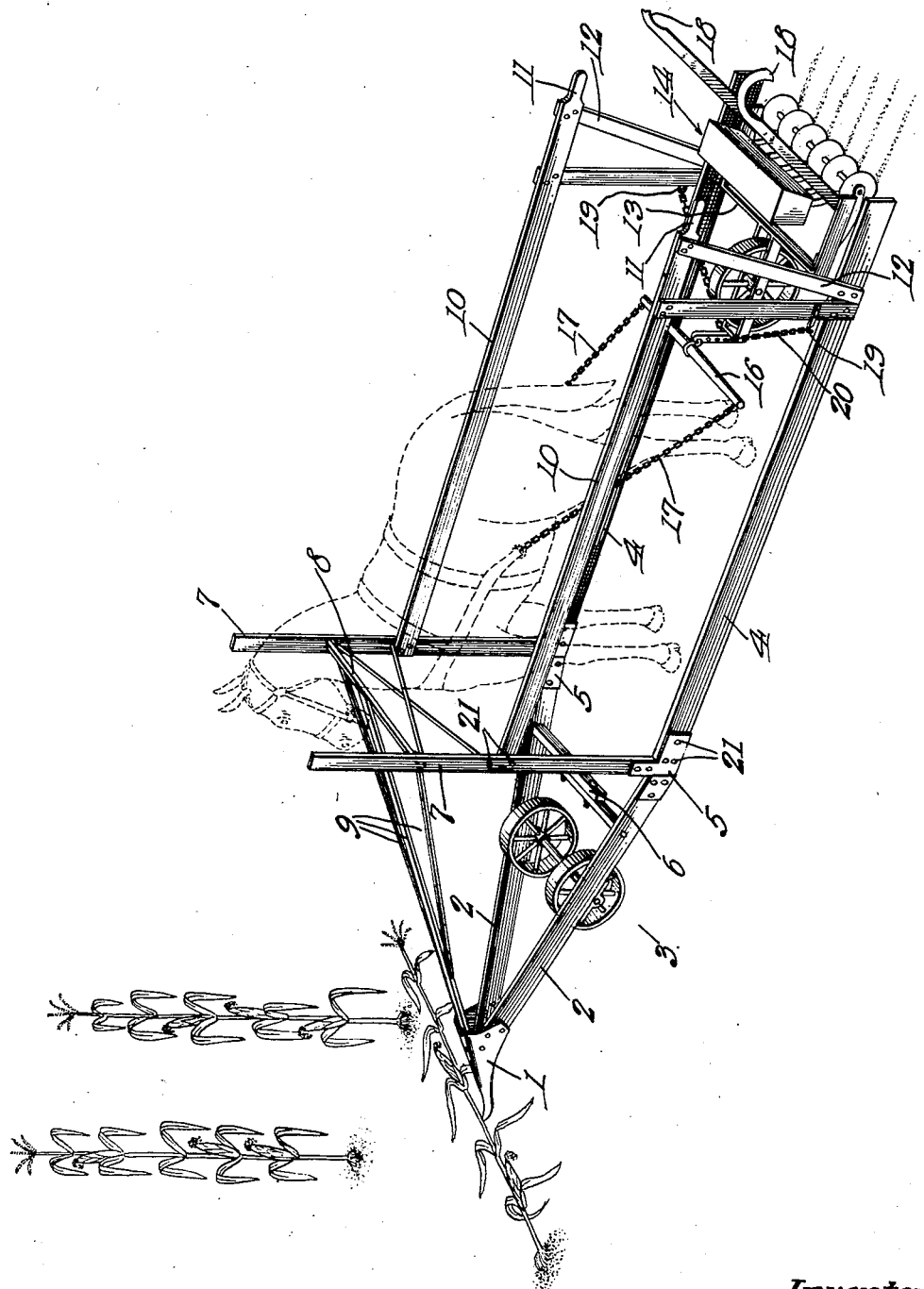

RAYMOND E. BRUNE, OF GREENFIELD, INDIANA.

CORN-TURNER.

1,318,963.     Specification of Letters Patent.     Patented Oct. 14, 1919.

Application filed May 6, 1919. Serial No. 295,117.

*To all whom it may concern:*

Be it known that I, RAYMOND E. BRUNE, a citizen of the United States, and resident of Greenfield, in the county of Hancock and State of Indiana, have invented a new and useful Corn-Turner, of which the following is a specification.

The object of my invention is to provide a novel device for turning the corn when down while sowing wheat, thus effecting a considerable saving of manual labor. It is further my object to provide a device that will not damage or knock the ears off the corn and which runs very lightly so that it can be readily pushed through the corn.

I attain the object of my invention by the mechanism illustrated in the accompanying drawings, in which—

The figure is a perspective of the entire machine as it appears in use.

Like numerals designate like parts in the view.

Referring to the accompanying drawings, I provide a suitable metal prow or nose adapted to pick up the stalks of corn lying across the rows. Member 1 is suitably bolted to bottom front frame bars 2 and to bracing bars 9. Bars 9 are attached to a cross-bar 8 which in turn is attached to uprights 7 which are releasably secured to bottom frame bars 2 and main bottom frame bars 4 by suitable metal plates 5 secured by removable bolts 21. I further provide top frame members 10 having rear handles 11. Frame members 10 are rigidly secured to bottom frame bars 4 by suitable uprights 12. Frame bars 4 and 10 are spaced sufficiently apart to admit a horse therebetween as illustrated in the drawing.

The frame bars 4 extend on either side of a suitable wheat-drill 13. The wheat-drill 13 is provided with guiding handles 18, a swingle-tree 16 and tug chains 17 by which the machine is attached to the horse. The wheat-drill is releasably attached to the frame of the corn-turner by means of suitable chains 20 and hooks 19. In sowing wheat or rye in standing corn my corn-turner is used in picking out the stalks that have been blown down or fallen across the space between the corn rows. The machine will not knock the corn off the stalk as the nose 1 picks up the stalks that have fallen across the rows and the upper bars 10 of the frame hold the stalks up until the wheat-drill has passed, when they again fall back into the row. The corn-turner frame also prevents the horse from stepping on the corn or knocking the ears of corn off the stalks and gives the wheat drill a clear space for seeding.

The labor of two men, which has heretofore been required in "turning the corn" where it is badly blown down is obviated by the use of my machine, since one man can do the work of three with this invention.

The horse is hitched to the corn-turner and drill by means of stay chains 17, the corn-turner being releasably attached to the wheat-drill 13 by chains 20 and hooks 19, as indicated in the drawing.

When driving out at the end of the row, the two chains 20 are unhitched from the frame of the turner and the operator takes hold of the corn-turner handles 11, pushing the corn-turner from the horse and drill and on around into the other row, as would be done with a wheel barrow. The horse is then driven into the turner and the two stay chains 20 again hooked to the frame of the corn-turner and the machine is proceeded with as before.

I claim—

1. In combination with a wheat drill, a corn turner comprising a wheeled frame having upper and lower main side members spaced apart sufficiently to admit a horse and the wheat drill therebetween, a nose at the front of the frame adapted to pick up corn stalks lying across its path, frame and bracing members converging toward and attached to the aforesaid prow, metal plates releasably attached to the aforesaid converging frame members and to the lower main frame members to releasably secure same together to permit of ready assembling and disassembling, a plurality of rear uprights attached to the respective main frame members, rearwardly extended handles on the upper main frame members for guiding the device, and means for releasably attaching the corn turner frame to a wheat drill positioned between the lower main frame members in proximity to the handles of the corn turner, substantially as and for the purposes described.

2. In combination with the device described in claim 1, a truck positioned within and attached to the converging frame members to which the prow is attached, whereby the wheels are protected from entanglement with the stalks.

3. In combination with a wheat drill, a corn turner having in combination a pointed metal prow, converging bracing and frame members attached to the prow and adapted to pick up stalks of corn lying across the path of the machine, main frame bars, uprights to which the frame bars and bracing bars are rigidly attached, the aforesaid frame being of such width as to admit a horse therebetween and adapted to prevent corn stalks being trampled, frame handles at the rear of the frame for manually guiding same, and means for releasably attaching the corn turner frame to the wheat drill, said wheat drill being adapted to be positioned between the frame members, substantially as shown.

RAYMOND E. BRUNE.